Patented May 12, 1925.

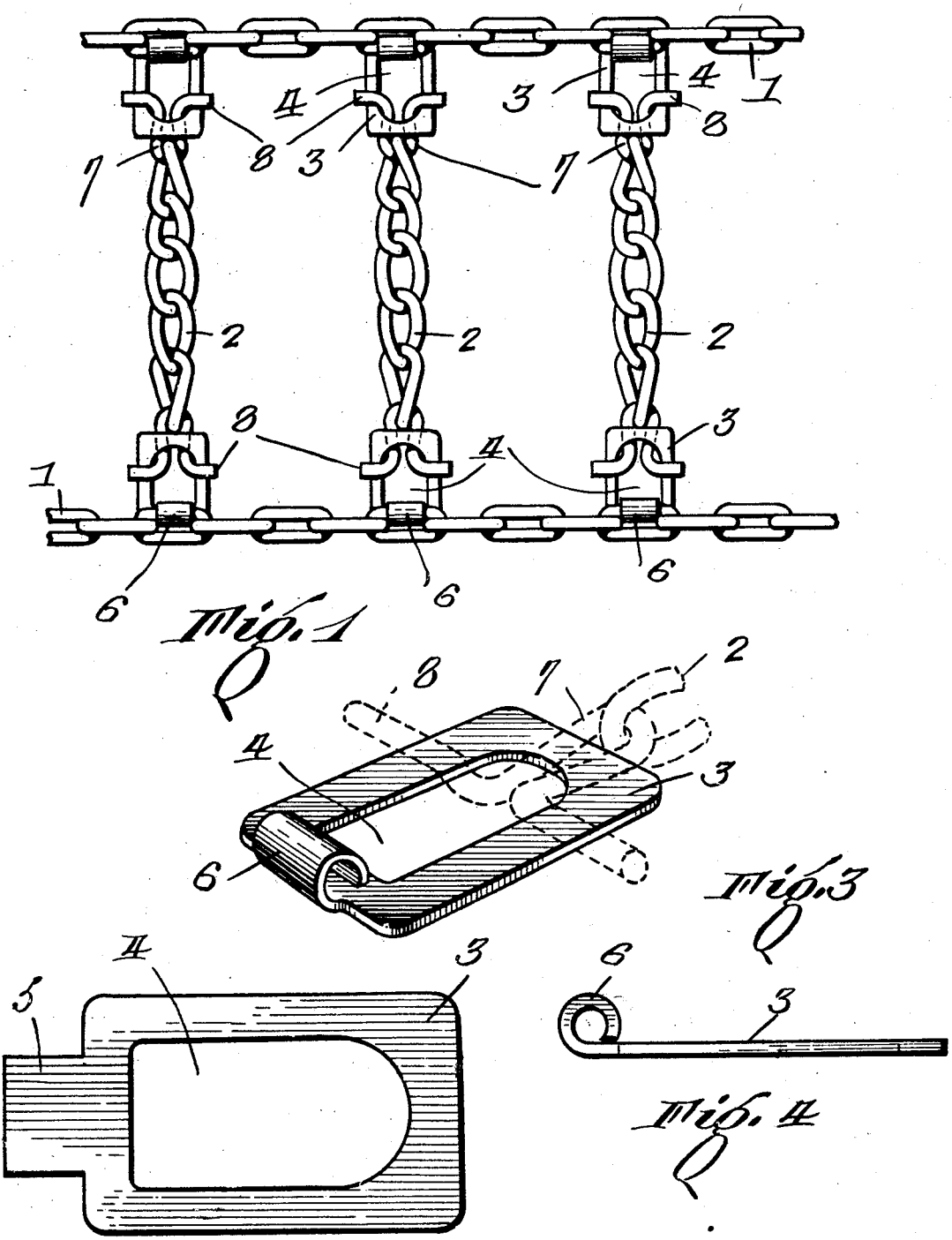

1,537,567

UNITED STATES PATENT OFFICE.

JOSEPH EMILE THOMAS, OF MONTREAL, QUEBEC, CANADA.

ATTACHING DEVICE FOR ANTISKID CHAINS.

Application filed March 25, 1924. Serial No. 701,789.

*To all whom it may concern:*

Be it known that I, JOSEPH EMILE THOMAS, a subject of the King of Great Britain, residing at Montreal, Province of Quebec, Canada, have invented certain new and useful Improvements in Attaching Devices for Antiskid Chains; and I do hereby declare that the following is a full, clear, and exact description of the invention, such as will enable others skilled in the art to which it appertains to make and use the same.

The present invention pertains to a novel attaching device for anti-skid chains, the function of which is to connect the tread chains to the side chains.

In the usual anti-skid device, the tread chains are positively secured to the side chains. When one of the tread chains breaks, the sections thereof remain attached to the tread chains and consequently beat against the mud guard during the movement of the vehicle. The object of the invention is to eliminate this objection. Accordingly, the tread chains are so attached to the side chains that they automatically become separated therefrom when broken. More specifically, the invention includes plates attached to the side chains, each plate being formed with an opening of sufficient size to permit the passage of a tread chain therethrough. The tread chains laid between the side chains have their end links opened and bent through the openings cut through the attaching plates. While the tread chains are intact, they cannot be freed from the plates, but upon being severed, the sections thereof work their way laterally through the openings in the plates and thus become separated from the side chains.

The invention is fully disclosed in the following description and in the accompanying drawings in which:

Figure 1 is a plan view of a chain equipped with the device of the invention;

Figure 2 is a plan view of the blank from which the attaching device is formed;

Figure 3 is a perspective view of the completed attaching device; and,

Figure 4 is an edge view thereof.

Reference will now be had to these views by means of like characters which are employed to designate corresponding parts throughout.

In Figure 1 the numeral 1 indicates the usual side chains between which are laid the tread chains 2. The latter are ordinarily connected to the side chains by having their end links wound around certain of the links of the side chains. In such a construction, when one of the tread chains breaks, the fragments thereof remain securely connected to the side chains and are consequently struck against the mud guards during the movement of the vehicle.

For the purpose of avoiding this objection, the present invention comprises a plurality of attaching members for the tread chains consisting each of a substantially rectangular plate 3 which is hollowed out as at 4. From a side of the plate extends a tab 5 which is curved to form an ear 6 encircling one of the links of a side chain as shown in Figure 1.

The tread chains 2 are laid between the plates 3 carried by opposite side chains. The end links 7 of the tread chains are opened, and the link ends 8 thus formed are passed through the spaces 4. The ends are then bent laterally in opposite directions over the sides of the plates so that they cannot be drawn through the openings in which they are received. It is to be noted in particular that the openings 4 are of sufficient width to allow the passage of the tread chains therethrough prior to bending the ends 8.

In the event that a tread chain becomes broken, the sections thereof are free to work towards the openings 4, since these chains are not positively attached to the plates 3. Finally the sections slip through the openings 4 and are entirely released from the side chains. The knocking of the tread chain sections against the mud guards, which occurs when the tread chains are positively fixed to the side chains, is thus avoided.

While a specific embodiment of the invention has been illustrated and described, it is to be understood that various alterations in the details of construction may be made without departing from the spirit of the invention as indicated by the appended claims.

Having thus fully described the invention, what I claim as new and desire to protect by Letters Patent is:—

1. In combination with a tread chain, a pair of attaching plates each formed with an opening of sufficient size to permit the chain to slip therethrough, the end links of the chain being received in said openings and loosely attached to the plates.

2. An anti-skid device comprising a pair of parallel side chains, plates secured thereto, said plates being formed each with an opening of sufficient size to permit a tread chain to slip therethrough, tread chains laid between the plates at opposite side chains, the end links of said chains being passed through the openings in the plates and spread to prevent retraction from said openings.

In witness whereof I have hereunto set my hand.

JOSEPH EMILE THOMAS.